E. E. WALKER & J. W. COX.
METHOD OF HEATING.
APPLICATION FILED FEB. 15, 1917.

1,256,959.

Patented Feb. 19, 1918.

UNITED STATES PATENT OFFICE.

EDWARD E. WALKER AND JOHN W. COX, OF ERIE, PENNSYLVANIA.

METHOD OF HEATING.

1,256,959.  Specification of Letters Patent.  Patented Feb. 19, 1918.

Application filed February 15, 1917. Serial No. 148,852.

*To all whom it may concern:*

Be it known that we, EDWARD E. WALKER, a citizen of the United States, and JOHN W. COX, a subject of the King of Great Britain, having declared my intention of becoming a citizen of the United States, residing at Erie, in the county of Erie and State of Pennsylvania, have invented new and useful Improvements in Methods of Heating, of which the following is a specification.

This invention relates to methods of heating and consists in certain improvements therein as will be hereinafter fully described and pointed out in the claims.

The object of the invention is to utilize an electric arc for heating matter where temperatures much below the temperature of the arc are used and the heat diffused over areas much greater than it is practical to cover with the arc. The invention may be used for various purposes but in the accompanying drawings, an example of its use is shown in connection with an annealing furnace wherein—

Figure 1:
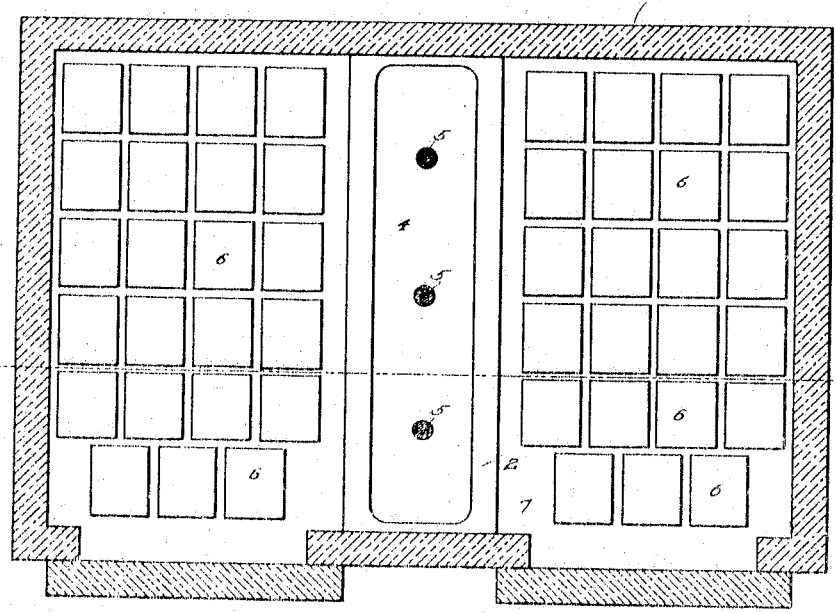
Figure 1 shows a horizontal section on the line 1—1 of Fig. 2.
Figure 2:
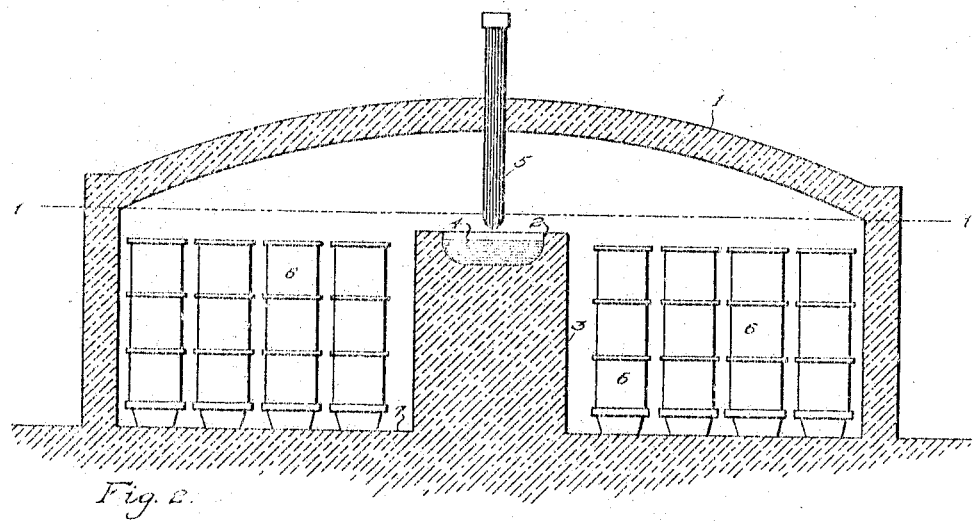
Fig. 2 shows a vertical section on the line 2—2 in Fig. 1.

1 marks the furnace wall, 2 a receptacle arranged within the space inclosed by the wall, 3 a support for the receptacle, 4 a liquid electrode, 5 a second electrode adapted to act with the liquid electrode and 6 receptacles for materials to be treated, as for instance, iron castings under treatment to make them malleable. These are arranged on the supporting floor 7 at the side of the receptacle 2.

Any metal fusing under an arc and having electric conductivity may be used for the electrode 4, for instance, iron may be used. The liquid electrode is agitated and the heat from the arc is thereby diffused throughout the liquid and diffused from the liquid, the liquid giving a large radiating surface effective for this purpose. The upper wall of the furnace receives and deflects this heat so that the heat is diffused throughout the furnace and communicated to the material being treated. The liquid electrode may be variously placed with relation to the walls of the furnace depending on the material to be treated and the convenience in operation.

We are aware that furnaces have been constructed for melting metals in which the metal is subjected to an electric current but in these furnaces the effort is to conserve the heat in the metal rather than to dissipate it as in the present invention.

The liquid electrode may be made molten or liquid through the action of the arc or may be introduced to the receptacle in this condition.

While we have shown this in connection with an annealing furnace we do not wish to be limited to this use of the method.

What we claim as new is:—

1. The method of heating which consists in forming an electric arc and taking up, diffusing and communicating the heat of the arc to matter to be heated through the medium of a liquid subjected to the arc, the matter being heated being independent of the liquid.

2. The method of heating which consists in forming an electric arc and taking up, diffusing and communicating the heat of the arc to the matter to be heated through the medium of a liquid subjected to the arc and forming one of the electrodes, the matter being heated being independent of the liquid.

3. The method of heating which consists in forming an electric arc and taking up, diffusing and communicating the heat of the arc to matter to be heated through the medium of a liquid subjected to and made molten by the arc, the matter being heated being independent of the liquid.

4. The method of heating which consists in forming an electric arc and taking up, diffusing and communicating the heat of the arc to matter to be heated through the medium of a liquid subjected to and made molten by the arc and forming one of the electrodes, the matter being heated being independent of the liquid.

In testimony whereof we have hereunto set our hands.

EDWARD E. WALKER.
JOHN W. COX.